United States Patent [19]

Katz et al.

[11] Patent Number: 4,600,553

[45] Date of Patent: Jul. 15, 1986

[54] REACTOR CAVITY

[75] Inventors: Leonard R. Katz, Leicester, England; Walter E. Desmarchais, Mississauga, Canada

[73] Assignee: Westinghouse Electric Corp., Pittsburgh, Pa.

[21] Appl. No.: 462,851

[22] Filed: Feb. 1, 1983

[51] Int. Cl.[4] .............................................. G21C 9/00
[52] U.S. Cl. .................................. 376/292; 376/287; 376/291; 376/293
[58] Field of Search ............... 376/204, 287, 291, 292, 376/293

[56] References Cited

U.S. PATENT DOCUMENTS 3,953,289  4/1976  Costes .................................. 376/204
4,028,176  6/1977  Kraupa ................................. 376/293

Primary Examiner—Deborah L. Kyle
Assistant Examiner—Richard W. Wendtland
Attorney, Agent, or Firm—Daniel C. Abeles

[57] ABSTRACT

A reactor cavity surrounding a reactor coolant inlet or outlet pipe is designed to reduce pressurization of the cavity in the event of a LOCA pipe break therein.

3 Claims, 7 Drawing Figures

REACTOR CAVITY

BACKGROUND OF THE INVENTION

This invention relates to the design of the structures and equipment supporting and surrounding the upper portion of water cooled nuclear reactors. The accident analysis required by the Nuclear Regulatory Commission (NRC) on nuclear plant designs includes the LOCA (Loss of Coolant Accident). The LOCA is defined as an instantaneous, circumferential, guillotine severance of the main coolant loop piping at selected locations. The primary loop equipment must be designed to survive the LOCA from the standpoint to core cooling. Specifically, those components which contribute to safety injection, control rod tripping and maintaining the mechanical configuration of the core may not exceed "Faulted Stress Limits" as defined by the NRC and the ASME Code. One of the main coolant loop piping locations requiring LOCA consideration is the weld joint between the reactor vessel nozzle and the nozzle safe end. The nozzle safe end is a stainless steel ring welded to the carbon steel nozzle in the vessel shop. Its purpose is to preclude the necessity of performing a bi-metallic weld in the field when joining the main coolant piping to the reactor vessel nozzles. Consideration of a LOCA at the nozzle safe end location predicts a pressurization of the space between the reactor vessel and the primary shield in the vicinity of the nozzle which is assumed to fail. This pressurization of the reactor cavity causes an asymmetric loading against the reactor vessel and its support systems. This condition results in stresses in the reactor vessel support shoes which could exceed the faulted stress limits.

Consequently it is desired to provide a reactor cavity arrangement which will reduce pressurization effects and resulting asymmetric forces on the reactor vessel.

SUMMARY OF THE INVENTION

The invention is a new reactor cavity design which serves to reduce the asymmetric loading on the reactor vessel resulting from the reactor cavity pressurization which follows a LOCA at the nozzle safe-end. This reactor cavity design reduces the effects of reactor cavity pressurization as follows:
1. Venting of the pipe break effluent away from the reactor vessel.
2. Orificing of the pipe-break effluent toward the reactor vessel.
3. Limiting the pipe break area which occurs as a result of the LOCA.

DESCRIPTION OF THE PREFERRED EMBODIMENT

Figure 1:
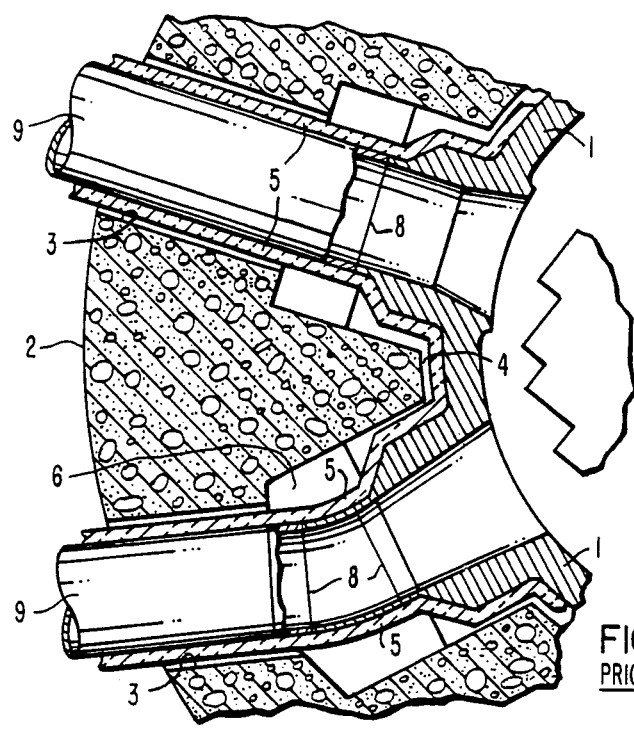
FIG. 1 is a plan view schematic of a prior art reactor cavity design.
Figure 2:
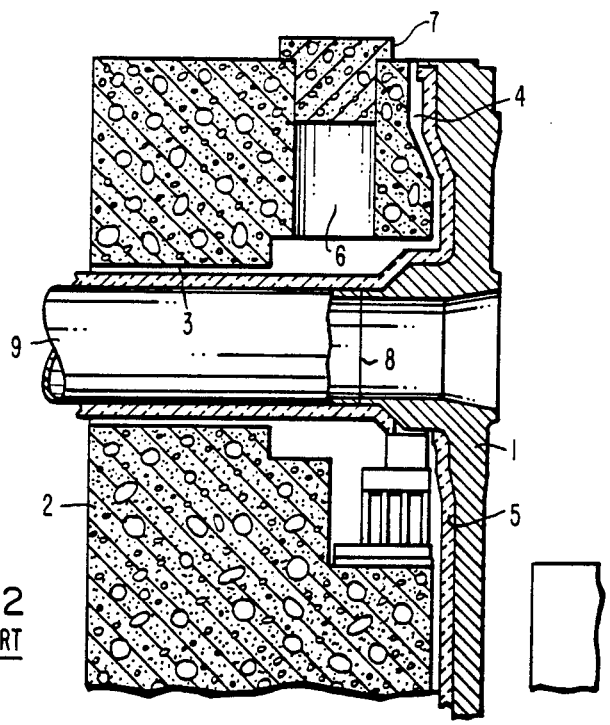
FIG. 2 is a profile view schematic of a prior art reactor cavity design.
Figure 3:
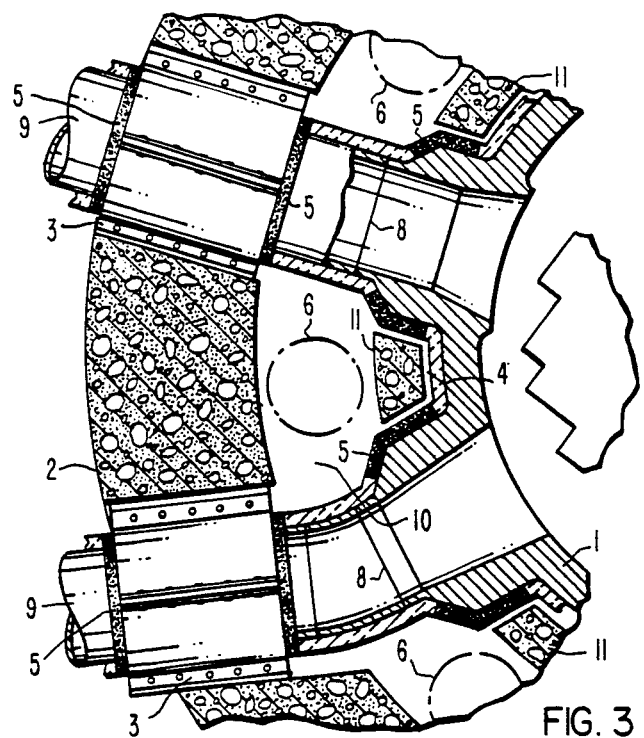
FIG. 3 is a plan view schematic of a new reactor cavity.
Figure 4:
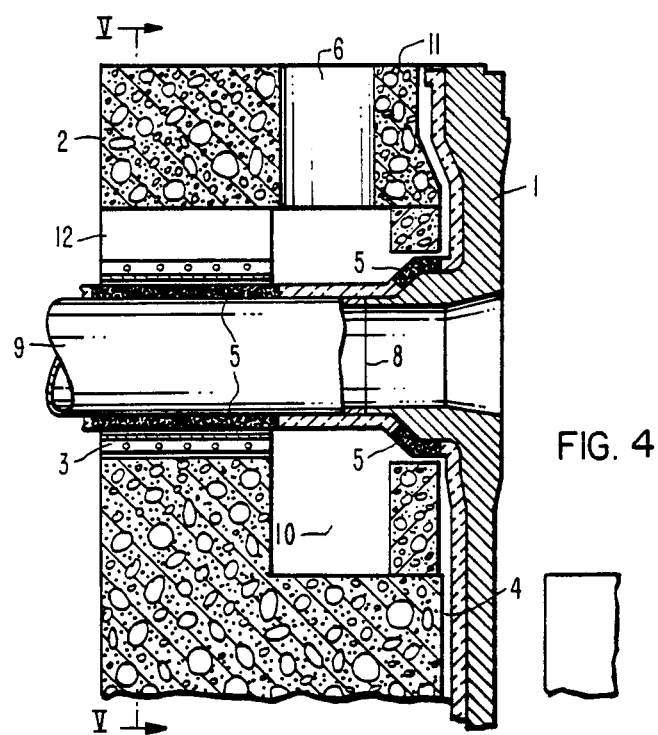
FIG. 4 is a profile view schematic of a new reactor cavity at the region of an inlet nozzle.
Figure 6:
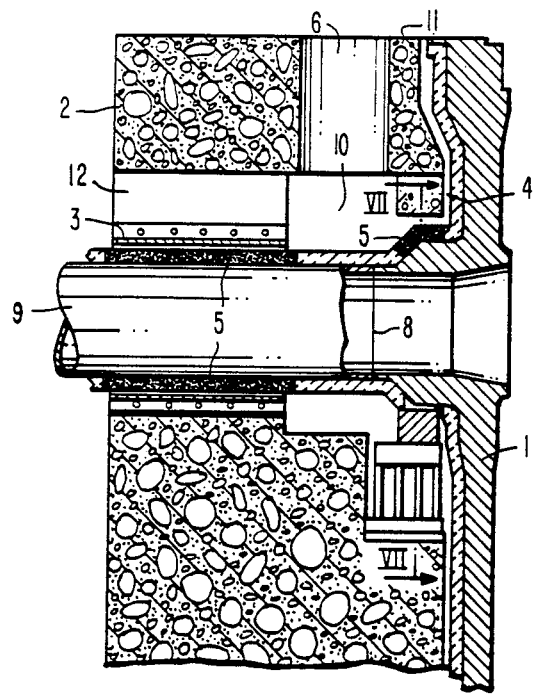
FIG. 6 is a profile view schematic of a new reactor cavity at the region of an outlet nozzle.
Figure 5:
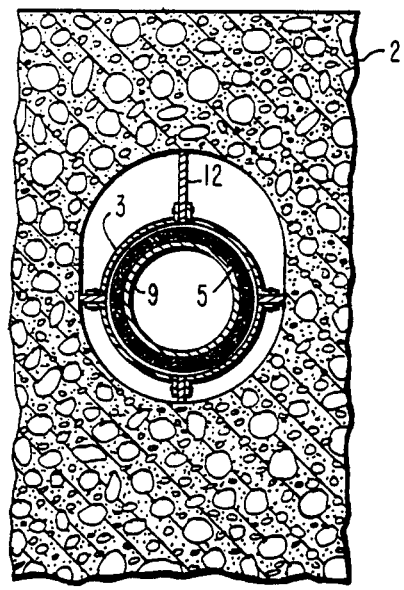
FIG. 5 is a detail from FIG. 4.
Figure 7:
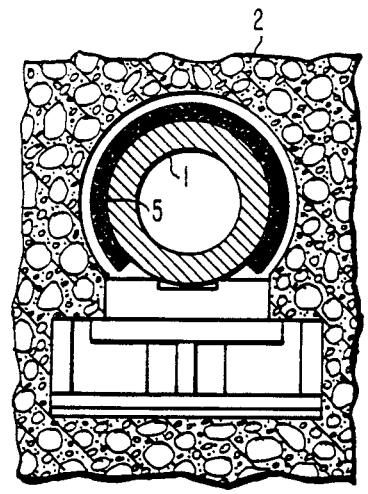
FIG. 7 is a detail from FIG. 6.

The present, prior art reactor cavity 4 arrangement is shown in FIGS. 1 and 2. Reactor vessel 1 is surrounded by a concrete, primary shield wall 2, contoured to closely follow the shape of reactor vessel 9. Primary shield 2 is penetrated by eight pipe sleeves 3 through which the main coolant piping 1 is installed. There is only two inches of clearance between pipe sleeve 3 and the outside of the pipe insulation 5. Primary shield 2 is also penetrated by eight (one shown) inservice inspection ports 6, one above each nozzle to provide access for inservice inspection. Each of these ports 6 is covered with a removable concrete plug 7. In the event of a LOCA occurring at the nozzle safe-end weld 8, pipe sleeve 3, inservice inspection port 6, and reactor cavity 4 would become pressurized as a result of the high energy water and steam escaping from the severed pipe 9. The escape route for the steam-water mixture is out through pipe sleeve 3 and into the cavity 4 between shield wall 2 and reactor vessel 1. Eventually, the pressure surge resulting from this transient reaches an equilibrium condition in cavity 4. In the first second of the transient, however, a peak pressure as high as 1000 psi can build up in the reactor cavity 4 adjacent to the nozzle containing the assumed pipe break. This pressure peak results in an asymmetric loading on the vessel 1 which can reach values as high as 10,000,000 pounds of force.

The new reactor cavity arrangement designed to solve the reactor cavity pressure problem is shown in FIGS. 3–7. This new reactor cavity arrangement differs from the present reactor cavity arrangement as follows:
1. A 37 inch wide annular inservice inspection space 10 circumscribes the reactor vessel at the nozzle elevation.
2. The eight large inservice inspection ports 6 above each nozzle are replaced by eight 30 inch diameter ports 6 located between each set of nozzles. No plugs 7 are provided to cover these ports 6.
3. The main coolant pipe sleeve 3 in primary shield 2 is enlarged and changed in shape from a circle to an oblong circle.
4. A 14 inch thick radial shield wall 11 circumscribes reactor vessel 1 to protect inspection personnel during inservice inspection of the nozzle to safe-end welds in the annular inspection space 10.
5. Non-crushable insulation 5 replaces the standard insulation 5 at the reactor vessel 1 nozzle location and over that portion of the main coolant pipe 9 which passes through pipe sleeve 3.
6. Pipe restraints in the form of motion limiting keys 12 are located in each enlarged pipe sleeve 3.

In the event of a LOCA at the nozzle to safe-end weld 8, the broken end of the main coolant pipe 9 will begin to displace from its normal position opening an area through which the high energy steam-water mixture will escape. After moving through the clearance provided in the pipe restraint, the pipe end will be stopped by the motion limiting restraints 12 minimizing the pipe opening area. The steam water mixture will then escape into the inservice inspection space 10 and flow circumferentially around space 10 and upward through the open inservice inspection ports 6, and outward through the enlarged pipe sleeves 3. Flow in toward the vessel 1 is hampered by virtue of the tight fitting gap between the radial 14 in. shield wall 11 and the non-crushable nozzle insulation 5.

The combination of limiting pipe break area, enhancing flow away from the vessel and inhibiting flow toward the vessel can reduce reactor cavity 4 pressure by as much as a factor of 3 to 4 and subsequently reduce the asymmetric force on reactor vessel 1 by a factor 10.

Several other features of this design are also noteworthy. (1) In order to limit pipe break area, and limit effluent flow toward the vessel 1, special insulation is required in the pipe restraint and on the reactor vessel nozzle. A material with good thermal conductivity and superior crush strength is used for this application. (2) Leaving the inservice inspection ports 6 open to enhance effluent flow away from the pipe break increases radiation streaming during plant operation. Reducing the size of these ports to 30 inches and locating them between nozzles rather than just above them serves to suitably reduce these radiation streaming effects. (3) The enlarged oblong pipe sleeve 3 also provides an additional radiation streaming path. Locating the main coolant pipe 9 toward the bottom of the sleeve 3 provides additional shielding in the form of the water filled pipe 9 to alleviate this additional streaming problem.

We claim:

1. A nuclear reactor comprising:
   a reactor vessel having a plurality of nozzles, a thick concreate primary shield surrounding said reactor vessel, a reactor cavity comprising a small spacing provided between said reactor vessel and said concrete primary shield;
   a plurality of passages traversing said concrete primary shield, and a plurality of liquid-coolant-carrying pipes positioned within said passages in said concrete primary shield, and said liquid-coolant-carrying pipes welded to said nozzles of said reactor vessel, said passages in said concrete primary shield having an oblong configuration, and motion-limiting keys provided within each of said passages to limit motion of said liquid-coolant-carrying pipes therein;
   said liquid-coolant-carrying pipes each having a carbon steel nozzle portion welded under shop conditions to a stainless steel ring portion in order to preclude the necessity of performing bimetallic welds in the field when joining said liquid-coolant-carrying pipes to said nozzles of said reactor vessel, and said bimetallic welds constituting a location for possible pipe rupture and a resulting loss of coolant fluid;
   an inservice annular-conformed inspection space provided in said concrete primary shield at the elevation of said carbon steel nozzle portions of said liquid-coolant-carrying pipes and surrounding said bimetallic welds to permit inservice inspection of said bimetallic welds, and large open inspection ports extending from the top of said primary concrete shield and opening into said annular-conformed inservice inspection space intermediate said liquid-coolant-carrying pipes;
   a relatively thick concrete radial shield wall positioned about the upper portion of said reactor vessel to protect inspection personnel, and a small spacing between said concrete radial shield wall and the upper portion of said reactor vessel forming an upper portion of said reactor cavity;
   a non-crushable insulation layer carried over that portion of said liquid-coolant-carrying pipes which traverse said passages in said concrete primary shield, a non-crushable insulation layer also carried over said nozzle portions of said reactor vessel to which said pipes are welded and forming a close spacing with said radial shield wall; and
   in the event of failure of one of said bimetallic welds, the resulting flow of escaping coolant is primarily directed upwardly through said inspection ports and also through said oblong passages provided through said concrete primary shield through which said liquid-coolant-carrying pipes pass to minimize any substantial pressure surges within said reactor cavity.

2. The nuclear reactor as specified in claim 1, wherein in the event of failure of one of said bimetallic welds, said motion-limiting keys associated with the liquid-coolant-carrying pipe in which the failure occurs limit the pipe break area to limit the flow of coolant therefrom.

3. The nuclear reactor as specified in claim 1, wherein those portions of said liquid-coolant-carrying pipes which pass through said passages in said concrete primary shield are encased in sleeve members which are spaced from said liquid-coolant-carrying pipes, said non-crushable insulation fills the spacing between said sleeve members and said liquid-coolant-carrying pipes, and said sleeve members are positioned near the bottom of said passages in said concrete primary shield.

* * * * *